United States Patent [19]

Siemiller

[11] Patent Number: 4,483,325

[45] Date of Patent: Nov. 20, 1984

[54] SOLARMAT

[76] Inventor: Gerald L. Siemiller, 3566 Minto Ct., San Jose, Calif. 95123

[21] Appl. No.: 493,067

[22] Filed: May 9, 1983

Related U.S. Application Data

[62] Division of Ser. No. 317,836, Nov. 3, 1981, Pat. No. 4,396,007.

[51] Int. Cl.³ .............................................. F24J 3/02
[52] U.S. Cl. .................................... 126/444; 165/170
[58] Field of Search .............. 126/444, 445, 426, 901; 165/170

[56] References Cited

U.S. PATENT DOCUMENTS

| | | | |
|---|---|---|---|
| 3,076,450 | 2/1963 | Gough | 126/444 |
| 3,077,190 | 2/1963 | Allen | 126/444 |
| 4,038,967 | 8/1977 | Stout | 126/444 |
| 4,080,955 | 3/1978 | Sandstrom | 126/444 |
| 4,159,709 | 7/1979 | Palazzetti | 126/444 |
| 4,203,421 | 5/1980 | Bencic | 126/444 |
| 4,227,514 | 10/1980 | Spitzer | 126/445 |
| 4,230,175 | 10/1980 | Disselbeck | 126/444 |
| 4,257,396 | 3/1981 | Reinert | 126/445 |
| 4,257,398 | 3/1981 | Watson | 126/445 |
| 4,368,726 | 1/1983 | Ellsworth | 126/445 |

OTHER PUBLICATIONS

The Condensed Chemical Dictionary, 1977, Van Nostrand Reinhold Co., p. 901, Ultraviolet Absorber.

Primary Examiner—Daniel J. O'Connor
Attorney, Agent, or Firm—Thomas E. Schatzel

[57] ABSTRACT

A solar heat exchanger having a mesh sandwiched between two thin films for transfer of radiant solar energy to a fluid drawn through the mesh by suction.

7 Claims, 5 Drawing Figures

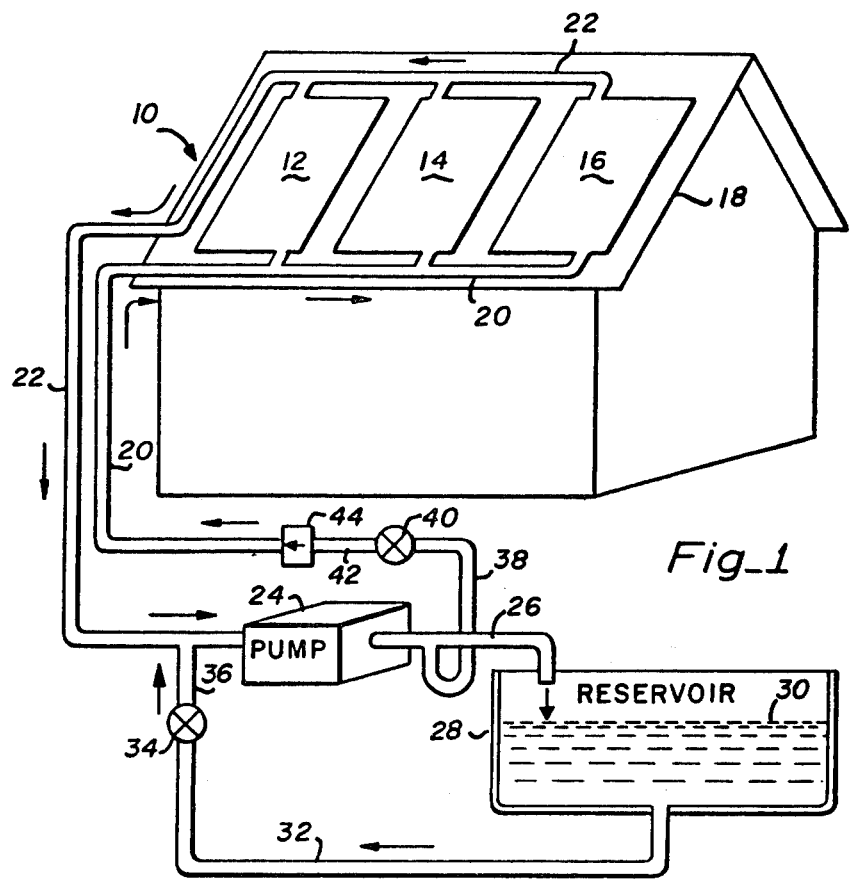
Fig_1
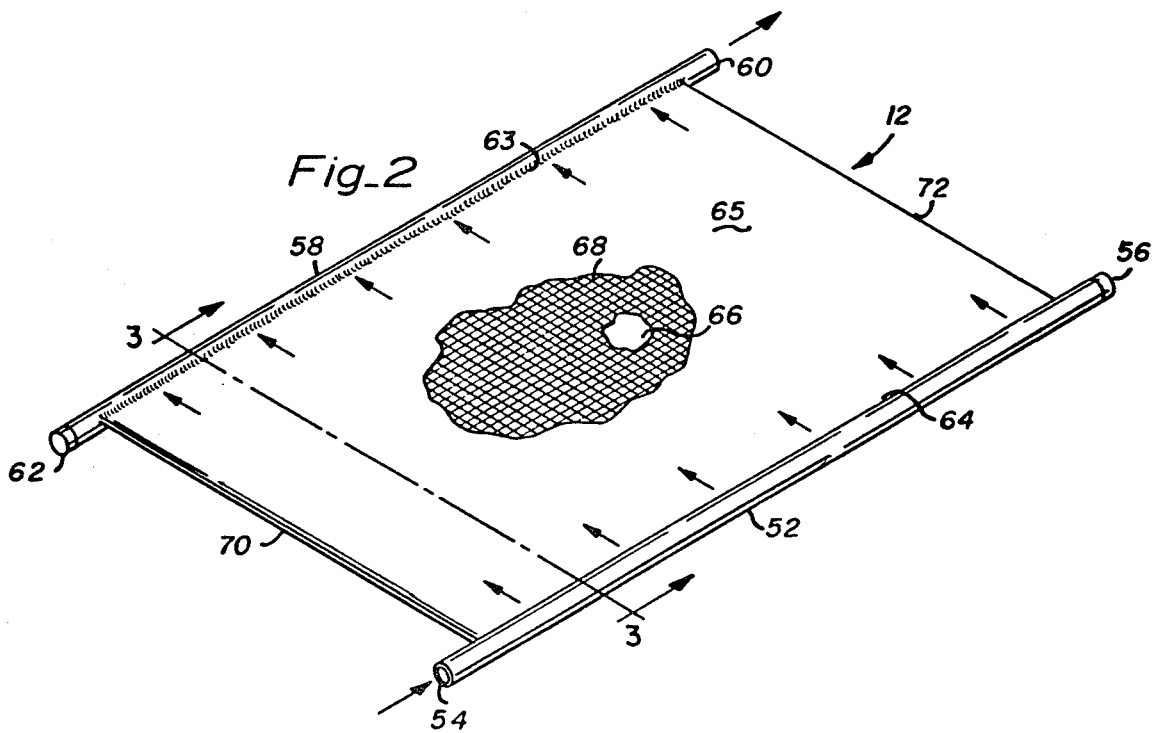
Fig_2

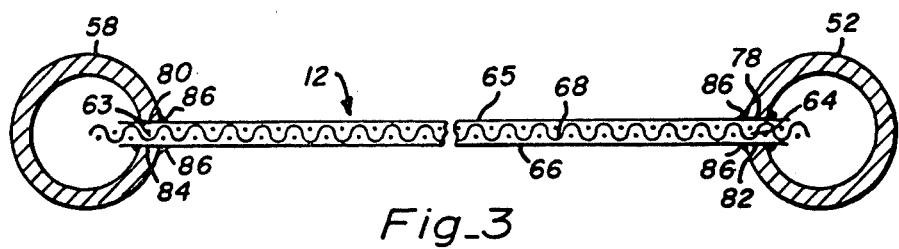
Fig_3
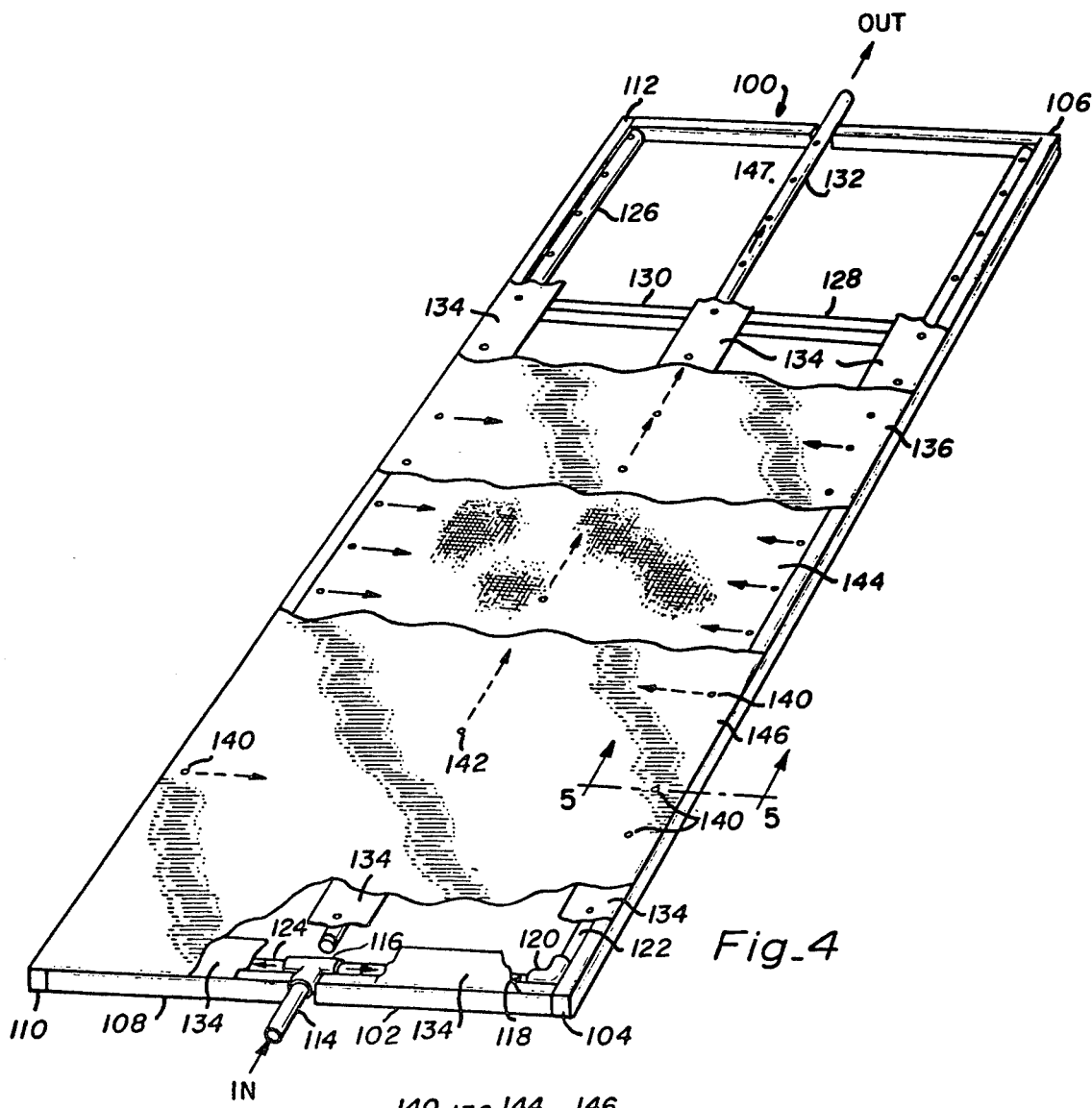
Fig_4
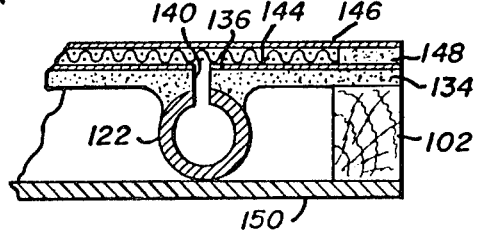
Fig_5

SOLARMAT

This is a division of application Ser. No. 06/317,836 filed Nov. 3, 1981, now U.S. Pat. No. 4,396,007.

BACKGROUND OF THE INVENTION

1. Field of the Invention

The present invention relates generally to solar heat exchangers and more particularly to a solar heat exchanger which operates at below atmospheric pressure and achieves high efficiency at a low cost.

2. Description of the Prior Art

Solar heat exchangers absorb the sun's radiant energy and transfer it to a fluid flowing through the exchanger. Generally, solar heat exchangers are constructed of rigid panels utilizing metal pipes through which a fluid is pumped. These panels are both heavy and expensive to construct.

Solar heat exchangers may operate at either above atmospheric pressure or below atmospheric pressure. When a solar heat exchanger operates at above atmospheric pressure, the transfer fluid is pumped through the exchanger. On the other hand, a solar heat exchanger which operates at below atmospheric pressure has the transfer fluid drawn through the exchanger by suction. A solar heat exchanger which operates at below atmospheric pressure is described in U.S. Pat. 4,048,981 issued to James C. Hobbs.

SUMMARY OF THE PRESENT INVENTION

It is therefore an object of the present invention to provide an improved solar heat exchanger having high efficiency.

It is a further object to provide an improved solar heat exchanger which is lightweight.

It is a further object to provide an improved solar heat exchanger which is inexpensive to construct.

Briefly, a preferred embodiment of the present invention includes an inlet pipe and an outlet pipe having two sheets of thin film bonded longitudinally to each pipe and having a mesh between the thin films. Solar heat is absorbed by the thin film and transferred to a fluid flowing through the mesh. High efficiency is achieved due to the thinness of the film and the turbulent flow through the mesh.

An advantage of the solar heat exchanger of the present invention is that the transfer of radiant solar energy to a fluid media is highly efficient.

Another advantage is that the solar heat exchanger is lightweight.

A further advantage is that the solar heat exchanger lends itself to being inexpensive to construct.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a schematic diagram of a solar heating system in accordance with the present invention;

FIG. 2 is a perspective view of a solar heat exchanger in accordance with the present invention with a portion broken away to illustrate otherwise hidden elements;

FIG. 3 is a cross-sectional view of the solar heat exchanger of FIG. 2 taken along the line 3—3;

FIG. 4 is a perspective view of an alternative embodiment of a solar heat exchanger of the present invention; and FIG. 5 is a cross-sectional view of the solar heat exchanger of FIG. 4 taken along the line 5—5.

DETAILED DESCRIPTION OF THE PREFERRED EMBODIMENT

FIG. 1 is a schematic diagram illustrating a solar heating system in accordance with the present invention and referred to by the general reference numeral 10. The solar heating system 10 includes a series of solar heat exchangers 12, 14, and 16. The solar heat exchangers 12, 14, and 16 may be installed in any suitable location and by way of illustration are installed on the roof of a building 18. A pipe 20 is connected to the lower end of each of the solar heat exchangers 12, 14, and 16 and a pipe 22 is connected at the high end of the solar heat exchangers 12, 14, and 16. The pipe 22 is connected to the inlet of a pump 24. The outlet of the pump 24 is connected to a pipe 26 which feeds into a reservoir 28. The reservoir 28 contains a fluid 30 which serves as the heat transfer medium. A pipe 32 is connected to the reservoir 30 and to a vacuum regulator 34. The regulator 34 is connected to a pipe 36 which is connected to the pipe 22. A pipe 38 is connected to the pipe 26 and also connected to a pressure regulator 40. The pipe 38 is J-shaped near the connection to pipe 26 to provide an air trap. The regulator 40 is connected to a pipe 42 which is connected to the inlet of a check valve 44. The outlet of the check valve 44 is connected to the pipe 20.

FIG. 2 is a perspective view of the solar heat exchanger 12, and FIG. 3 is a cross-sectional view of the panel taken along the line 3—3. The solar heaters 14 and 16 are of the same construction as the exchanger 12. Therefore, only the exchanger 12 will be described. The solar heat exchanger 12 includes an inlet pipe 52 which is joined to the pipe 20 in the overall system 10. The pipe 52 has an inlet port 54 about one end and a cap 56 about the other end.

The solar heat exchanger 12 also includes an outlet pipe 58 which is joined to the pipe 22 in the overall system 10. The pipe 58 has an outlet port 60 about one end and a cap 62 about the other end. The inlet pipe 52 and the outlet pipe 58 each include a longitudinal slot 64 and 63, respectively, extending to near proximity of each end. A thin film 65 is bonded to the longitudinal slot 64 of the inlet pipe 52 and the slot 63 of the outlet pipe 58. A second thin film 66 is also bonded to the longitudinal slot 64 of the inlet pipe 52 and the slot 63 of the outlet pipe 58. A mesh 68 is positioned between the thin film 65 and the thin film 66. The thin film 65 and the thin film 66 are bonded together at a lateral edge 70 and a lateral edge 72. In FIG. 2, a portion of the film 65 is broken away to illustrate the mesh 68 and a part of the mesh 68 is broken away to illustrate the film 66. The mesh 68 is held in fixed position by bonding it to the thin films 65 and 66 at several locations.

As illustrated best in FIG. 3, the thin film 65 is bonded to the inlet pipe 52 at an upper edge 78 of the slot 64. The thin film 65 is also bonded to the outlet pipe 58 at an upper edge 80 of the slot 63. Likewise, the thin film 66 is bonded to a lower edge 82 of the slot 64 and a lower edge 84 of the slot 63. The thin films 65 and 66 extend beyond the slot 63 and 64 into the interior of the pipes 52 and 58. The mesh 68 also extends beyond the slots 63 and 64 into the interior of the pipes 52 and 58 and also beyond the edges of the thin films 65 and 66.

This ensures secure bonding to the edges 78, 80, 82 and 84 and also that the slot 63 and 64 will not be blocked off. In the preferred embodiment a commercially available silicone rubber material 86 is used to bond the thin films 65 and 66 to the inlet pipe 52 and the outlet pipe 58.

In the preferred embodiment, the thin films 65 and 66 comprise UV inhibited polyester film having a thickness of approximately five thousandths of an inch. It is also recommended that the thin film 65 be of black color to increase absorptance. A woven synthetic material is suitable for the mesh 68, however, an aluminum mesh would also be acceptable.

The operation of the solar heatng system 10 is believed to be as follows. Referring to FIG. 1, all the solar heat exchangers 12, 14 and 16 are constructed in the same manner. The fluid 30 contained in the reservoir 28 is drawn by the pump 24 through the pipe 32, through the regulator 34, through the pipe 36, and into the pump 24 through the pipe 22. The regulator 34 reduces the pressure at the inlet of the pump 24 so that a suction is created at the outlets of the solar heat exchangers 12, 14 and 16. The regulator 34 is necessary due to the higher friction in the flow path from the solar heat exchangers 12, 14 and 16 to the pump 24 than in the flow path from the reservoir 28 to the pump 24.

A portion of the fluid 30 which flows out of the pump 24 will return to the reservoir 28 through the pipe 26 and the rest of the fluid will flow into the pipe 38. The amount of fluid which flows into the pipe 38 is dependent upon the forcefullness of the pump 24 and is regulated by the regulator 40. From the pipe 38 the fluid 30 flows through the regulator 40, through the pipe 42, through the check valve 44, through the pipe 20 and into the solar heat exchangers 12, 14 and 16. The regulator 40 is adjusted so that the fluid pressure at the inlet of the solar heat exchangers 12, 14 and 16 is less than or equal to one local atmosphere.

When the solar heating system 10 is initially installed, the solar heat exchangers 12, 14 and 16 and the pipes will be filled with air. The pump 24 is turned on and the air will be drawn out of the solar heat exchangers 12, 14 and 16 and they will become filled with the fluid 30. The check value 44 prevents the fluid 30 from flowing out of the solar heat exchangers 12, 14 and 16 when there is a small leak in the system 10 and the pump 24 is not operating. Thus, the solar heating system 10 remains a closed system filled with only the fluid 30.

Referring now to FIGS. 2 and 3, the fluid pressure at the inlet port 54 is less than or equal to one local atmosphere. The outlet port 60 is at the same or a slightly higher elevation so that suction from the pump 24 will cause the fluid 30 to be drawn through the solar heat exchangers 12, 14 and 16. Solar radiation will impinge upon the surface of the thin film 65. The radiation is then transferred by conduction to the fluid 30 flowing through the mesh 68. Since the solar heat exchangers 12, 14 and 16 operate at below atmospheric pressure, the thin films 65 and 66 will be drawn against the mesh 68. This will allow efficient conduction of the solar radiation to the fluid 30. Furthermore, the mesh 68 causes turbulent flow of the fluid 30 and thereby reduces the boundary layer thickness near the surface of the thin film 65. The reduced boundary layer thickness of the fluid 30 increases the amount of radiation absorbed by the fluid 30.

FIGS. 4 and 5 illustrate an alternative embodiment of the solar heat exchanger having side-to-center flow and is referred to by the general reference numeral 100. The solar heat exchanger 100 includes a support frame 102 which comprises three sections joined at corners 104 and 106. The solar heat exchanger 100 also includes a support frame 108 which also comprises three sections joined at corners 110 and 112.

The solar heat exchanger 100 further includes an inlet pipe 114 connected to a T-connector 116. An inlet pipe 118 is connected to the T-connector 116 and further connected to an elbow 120. An inlet pipe 122 is also connected to the elbow 120. Connected to the other side of the T-connector 116 is an inlet pipe 124. The inlet pipe 124 is connected to an elbow (not shown) but similar to elbow 120 located adjacent to the corner 110. An inlet pipe 126 is connected to the elbow adjacent to the corner 110. The solar heat exchanger 100 also includes a pair of cross support members 128 and 130. Additional cross support members (not shown but similar to cross support members 128 and 130) are spaced longitudinally along the solar heat exchanger 100. The heat exchanger 100 also includes an outlet pipe 132 which is centrally located between inlet pipes 122 and 126.

The support frames 102 and 108, the inlet pipes 114, 118, 122, 124, and 126, the T-connector 116, the elbow 120, the elbow adjacent the corner 110, the cross support members 128, 130, and the additional longitudinally spaced cross support members, and the outlet pipe 132 are molded into a fiberglass member 134 so that they are maintained in a fixed relationship.

The solar heat exchanger 100 also includes a thin film 136 fit over the support frames 102, 108, etc. and bonded to the fiberglass member 134 with a silicone rubber material. After the thin film 136 is bonded to the fiberglass 134, a plurality of holes 140 are drilled through the thin film 136, the fiberglass 134, and into the inlet pipes 122 and 126. The holes 140 are longitudinally spaced along the inlet pipes 22 and 126. Similarly, a plurality of longitudinally spaced holes 142 are drilled through the thin film 136, the fiberglass 134 and into the outlet pipe 132.

The solar heat exchanger 100 includes a mesh 144 positioned over the thin film 136 such that it covers the holes 140 and 142 but does not extend to the edges of the frames 102 and 108. A thin film 146 is positioned over the mesh 144 and the thin film 136.

As illustrated in FIG. 5, the thin film 136 and the thin film 146 are bonded together by a layer of silicone rubber material 148. The layer of silicone rubber material 148 extends around the periphery of the solar heat exchanger 100 so that the only openings to the space between the thin films 136 and 146 are the holes 140 and 142. A backing sheet 150 is positioned at the bottom of the solar heat exchanger 100. The interior spaces of the solar heat exchanger 100 may be filled with insulation. The backing sheet 150 and insulation are optional items but would be recommended where heat loss would be likely to occur such as in a cold and/or windy climate.

The operation of the solar heat exchanger 100 is believed to be as follows. The solar heat exchanger 100 may be installed in a system similar to the solar heating system 10 and the operation would be similar to the operation of the solar heat exchanger 50. The difference being that the fluid is drawn into the solar heat exchanger 100 at both sides through the inlet pipes 122 and 126. The fluid is then drawn through the holes 140 and through the mesh 144 to the center of the solar heat exchanger 100. The fluid then flows through the holes 142 into the outlet pipe 132.

The solar heat exchanger 100 is more rigid and more expensive to construct than the solar heat exchanger 12. However, both the solar heat exchanger 12 and the solar heat exchanger 100 achieve high efficiency at a low cost.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A solar heat exchanger, comprising:
   a first thin film of a substantially planar configuration and formed of a polyester material having a thickness of approximately five thousandths of an inch;
   a second thin film substantially indentical to the first thin film and bonded to the first thin film about the edges thereof, said first and second films enclosing a substantially planar space therebetween;
   a mesh of dimensions substantially similar to the first and second films and positioned therebetween, said mesh substantially filling the planar space formed between the films, the films and the mesh together forming a solar panel, said solar panel including a plurality of inlet apertures formed through one thin film near each longitudinal edge thereof, and a plurality of outlet apertures formed through one thin film about a central longitudinal axis of the panel;
   inlet means connected to said solar panel and adapted for connection to a heat transfer fluid supply for permitting a heat transfer fluid to enter the space formed therein, said inlet means including a pair of inlet pipes, each pipe being positioned near a longitudinal edge of the solar panel, said inlet pipes including a plurality of apertures formed therein abot said pipes' longitudinal dimensions, said plurality of apertures equal in number and spacing to said apertures formed in the solar panel, and adapted for mating with said inlet apertures in the solar panel to allow fluid to flow from the inlet means to the panel; and
   outlet means connected to said solar panel and adapted for connection to a suction means, the outlet means including an outlet pipe positioned about a central longitudinal axis of said solar panel, said outlet pipe including a plurality of apertures formed therein about said pipe's longitudinal axis and adapted for mating with said apertures in said solar panel's longitudinal axis to allow fluid to flow from said panel to the outlet means, the outlet means being positioned distal to the inlet means such that said heat transfer fluid flow through the mesh covers approximately the entire region between the first thin film and the second thin film whereby said heat transfer fluid may be drawn by suction from the inlet means to the outlet means and solar radiation impinging on the solar panel is transferred to said fluid.

2. The solar heat exchanger of claim 1 wherein: the inlet means includes a first and second inlet pipe bonded to opposite edges of the second thin film and having a plurality of longitudinally spaced holes through the second thin film into the first and second inlet pipes whereby said fluid may flow into the space between the first and second thin films through said longitudinally spaced holes; and
   the outlet means comprises an outlet pipe bonded to the second thin film and positioned between the first and second inlet pipes and having a plurality of longitudinally spaced holes through the second thin film into the outlet pipe whereby said fluid may flow from the space between the first and second thin film into the outlet pipe.

3. The solar heat exchanger of claim 2, further comprising:
   a frame to which the second thin film is bonded.

4. The solar heat exchanger of claim 2 wherein:
   the first and second thin films are polyester.

5. The solar heat exchanger of claim 2 wherein:
   the first and second thin films are UV inhibited polyester and have a thickness of approximately five thousandths of an inch.

6. The solar heat exchanger of claim 2 wherein:
   the first thin film is of black color.

7. The solar heat exchanger of claim 1, wherein;
   said solar panel and the inlet and outlet means are supported by rigid framework.

* * * * *